United States Patent [19]

Li

[11] 4,302,938
[45] Dec. 1, 1981

[54] NITINOL ENGINE FOR LOW GRADE HEAT

[76] Inventor: Yao T. Li, Huckleberry Hill, Lincoln, Mass. 01773

[21] Appl. No.: 933,528

[22] Filed: Aug. 14, 1978

[51] Int. Cl.³ ............................................. F03G 7/06
[52] U.S. Cl. ...................................................... 60/527
[58] Field of Search ................................ 60/527, 529

[56] References Cited

U.S. PATENT DOCUMENTS

| 3,303,642 | 2/1967 | Lee | 60/527 X |
| 4,010,612 | 3/1977 | Sandoval | 60/527 |
| 4,117,680 | 10/1978 | Smith | 60/527 |

Primary Examiner—Allen M. Ostrager
Attorney, Agent, or Firm—Kenway & Jenney

[57] ABSTRACT

A continuous band of Nitinol wrapping in between a cluster of tightly engaged rollers to form a series of S-shaped bends is used as the principle working medium of a thermal engine to convert low grade heat to mechanical power output. The band, together with the rollers, divides the space into an inner and an outer zone. A stream of warmer water and a stream of cooler water are guided to flow separately through one or the other of the two zones to make uniform and intimate contact with the segments of the Nitinol band alternatively at appropriate intervals. A well defined four-cycle operation of temperature and stress is thus established and can convert a portion of the energy which is available in the thermal gradient of the two water streams into a mechanical shaft power which may be tapped from one of the rollers.

7 Claims, 12 Drawing Figures

NITINOL ENGINE FOR LOW GRADE HEAT

PRIOR ART AND OBJECTIVE

The use of Nitinol (or other kinds of solid material which has a temperature triggered memory for its preconditioned physical shape) as the working medium of a thermal engine has been conceived in numerous configurations. None, however, has been able to establish in practice or theory the ability to convert low grade heat such as the thermal gradient of ocean water or the cooling water of a nuclear or conventional power plant, to mechanical power with the desirable scale of output for utility application, such as thousands of killowatt at a reasonable size and cost. It is the objective of the present invention to accomplish this type of goal.

One reason for the failure of the prior art is because Nitinol is a new material. No scientific study of its basic behavior as a working medium has been estalished. In the present documentation a thermodynamic cycle concept of Nitinol is hypothesized first, from which the dominating parameters become apparent and the desirable configuration evolved. The cycling concept and the necessary constraint of each working cycle helped to identify the imperfection of earlier attempts. In parallel with the cycling concept, an appreciation of the low power density of the low grade heat dictates that the efficient use of the structure member is a necessary condition for a practical configuration. Design estimation is included herein to demonstrate the feasibility of this new system to be used for large scale utility purpose, as well as for smaller auxilliary power converter.

Having thus introduced the objectives, the following figures will be used to give a clear illustration of the working principles of my invention in its various forms.

A STUDY OF THE EFFICIENCY OF A THERMAL ENGINE FOR LOW GRADE HEAT

Figure 1:
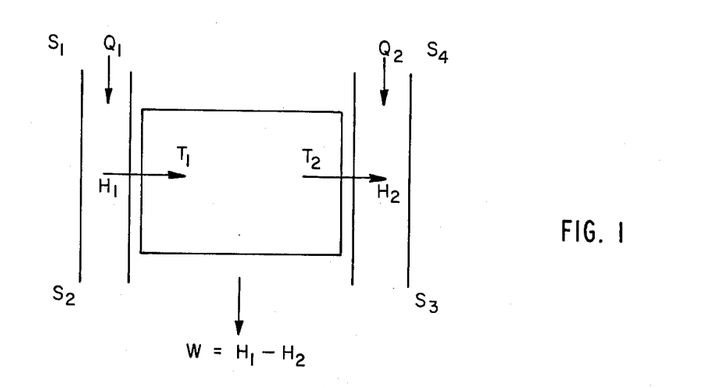
FIG. 1; A conceptual layout of the key parameters of a thermal engine utilizing low grade heat.

FIG. 1 shows conceptually the key parameters of a thermal engine utilizing low grade heat, which is to be supplied from a heat source with an initial temperature $S_1$ and a heat sink which has an initial temperature $S_4$.

As an example, the engine may take in the warmer surface ocean water (or other substances) at temperature $S_1$ and may discharge it at temperature $S_2$ with $Q_1$ as the flow rate.

Likewise, the heat sink flow pass may take in the cold water from the deep part of the ocean at temperature $S_4$ and discharge it at temperature $S_3$ with a flow rate of $Q_2$.

In this manner the engine operates between temperatures $T_1$ and $T_2$ and receives an input heat energy $H_1$, while expelling an output heat energy $H_2$. The net mechanical work output, if no other form of energy dissipation is involved, would be $$W = H_1 - H_2 \quad [1]$$

The conversion is total when $$S_2 = S_3 = S_4 \quad [2]$$

For a simple example, let $Q_1 = Q_2$ and, assuming the specific heat of the substances of the source and sink to be the same, then the thermal efficiency of the engine would be $$E = \frac{(S_1 - S_2) - (S_3 - S_4)}{S_1 - S_4} = 100\% \text{ when } S_2 = S_3 = S_4 \quad [3]$$

Figure 2:
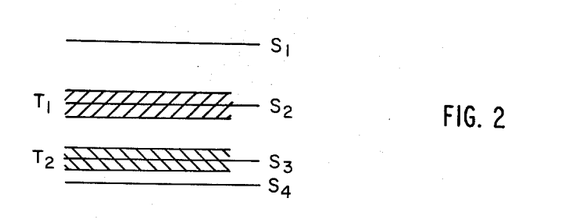
FIG. 2; A temperature ladder of the various ingredients involved in a thermal engine.

FIG. 2 portrays in a ladder form the scale of the temperatures involved in the various ingredients of the engine of FIG. 1. In this diagram $T_1$ and $T_2$ are shown as two shaded bands which represent the possible spread of these two temperature zones around $S_2$ and $S_3$ due to the possible use of counter flow technique and due to certain peculiar characteristics of the working media which may instantaneously change its internal latent heat. In any event, these temperatures are arranged as shown in the ladder form in which $S_1 - S_2$ must be larger than $S_3 - S_4$ in order to yield mechanical output.

The diagrams of FIG. 1 and FIG. 2 illustrate that a thermal engine for low grade heat must involve the handling of the flow of the substances pertaining to the heat source and heat sink. The power needed to circulate these substances must also be subtracted from the mechanical output of the engine.

THE HYPOTHETICAL CYCLE OF THE NITINOL ENGINE

Figure 3:
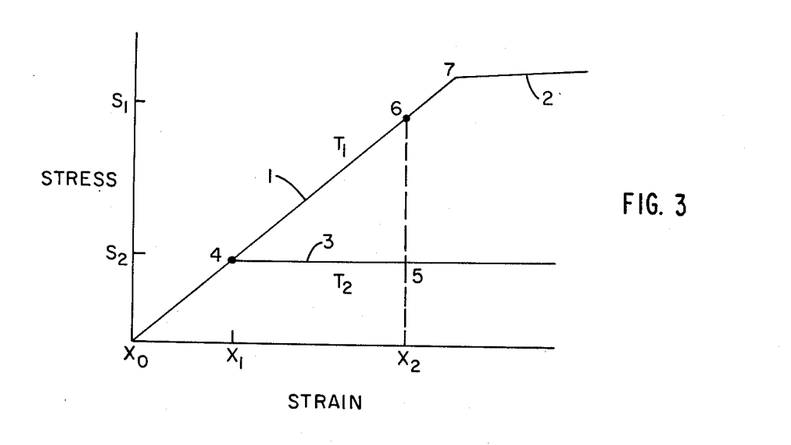
FIG. 3; A hypothetical characteristic of Nitinol or other material having temperature triggered shape memory.

FIG. 3 illustrates the behavior of a material with a thermal triggered shape memory, such as Nitinol.

At a temperature $\geq T_1$ ($T_1$ is the higher value of a transition temperature zone), the material behaves with a stress-strain curve as represented by curve 1, which has a high yielding point 7, beyond which the stress-strain curve is changed to curve 2.

At a temperature $\leq T_2$, the lower value of the transition temperature zone, the material exhibits a lower yielding point at point 4. Thereafter the stress-strain behavior follows curve 3.

A strain $X_2$ may be chosen which is lower than the value corresponding to the high yielding point 7 and higher than the value corresponding to the low yielding point 4. By holding the strain at $X_2$, the internal reaction stress may be shifted from $s_2$ at point 5 to $s_1$ at point 6, when the temperature is changed from $T_2$ to $T_1$. Thus a mechanical potential energy is realized with the introduction of thermal energy.

For a continuously operating engine each section of the material is subjected to a sequence of four cycles as follows:

°Cycle 1: At temperature $\leq T_2$, introduce strain $X_2$ from $X_0$ (the process may start from either $X_0$ or $X_1$), by following curve 1 to point 4 and then curve 3 to point 5. The mechanical work represented by the area of the trapezoid $X_0$-4-5-$X_2$ thus is added into the system.

°Cycle 2: Hold strain $X_2$; add heat to change temperature from $T_2$ to $T_1$, which causes a change of the internal stress from $s_2$ to $s_1$.

°Cycle 3: Maintain $T_1$; release the external constraint to allow the strain to return to $X_0$ from $X_2$ by following curve 1, to move from point 6 through 4 to $X_0$. This process generates a mechanical output work which is represented by the area of the triangle $X_0$-$X_2$-6. For this cycle, if the material tends to reduce the temperature from $T_1$ while expanding, then either adding heat during the cycle, or raising the initial temperature higher than $T_1$ prior to the start of this cycle to allow the sustaining of the cycle operation. Similar consideration should be allowed for cycle 1.

°Cycle 4: Reduce the temperature from $T_1$ to $T_2$ and complete the four cycles.

The net work output per four cycle operation is represented by the area of the triangle 4-5-6.

An effective engine is one in which each section of the Nitinol material is constrained by external means to go through the above four cycles of stress-strain change along with the thermal activities without ambiguity.

Furthermore, the value $X_2$ is chosen so that the corresponding point 6 is well below point 7 to assume good fatigue life and well above point 4 to be effective as an engine. The "plastic" deformation of curve 3 is apparently caused by the relaxation of the atomic structure of the material and not due to the slippage of the molecular bond and for this reason it should not cause fatigue failure which usually is associated with ordinary plastic deformation of the molecular bond.

The cycling of the temperature beyond the transition temperature zone $T_1$ and $T_2$, and within a certain limit, would not affect the cyclic property, but with no additional mechanical output and hence representing a lower conversion efficiency.

CONFIGURATION OF A FOUR CYCLE NITINOL ENGINE

Figure 4:
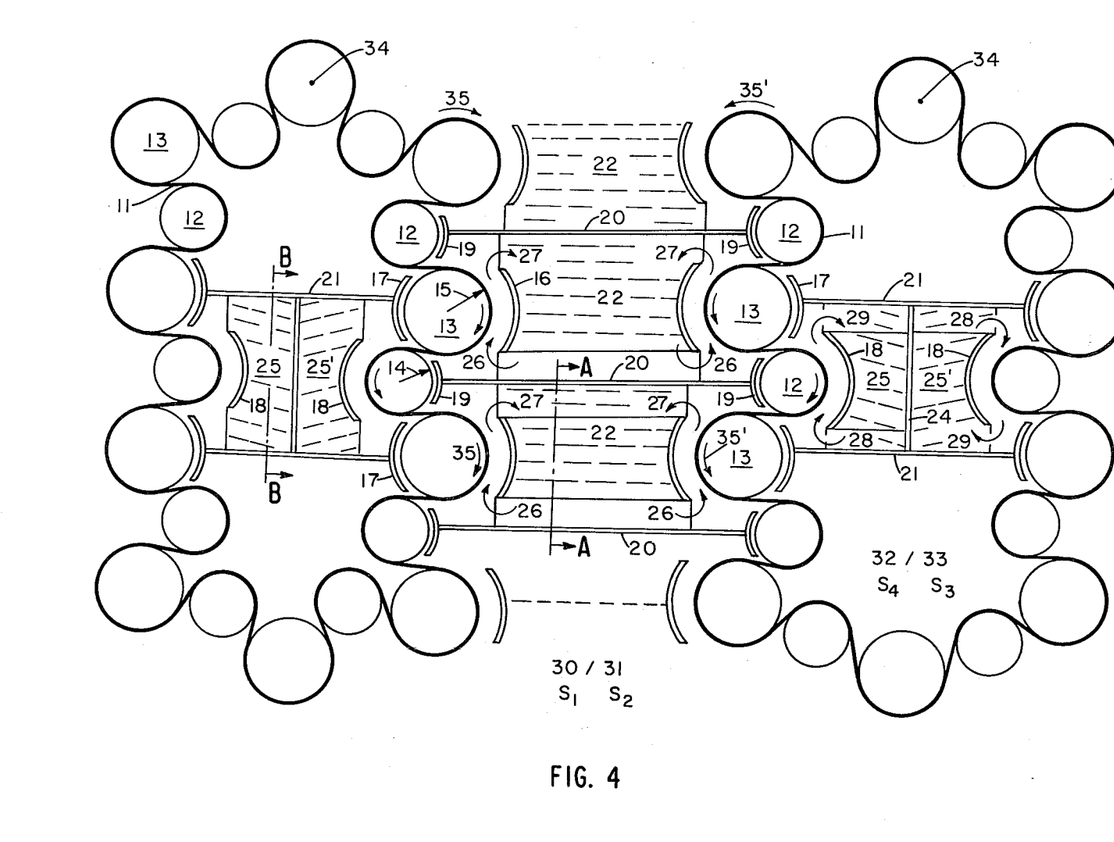
FIG. 4; A portion of a Nitinol engine showing two clusters of tightly engaged rollers coupled by multiple-S loops of a continuous Nitinol band.

FIG. 4 shows conceptually a section of a Nitinol engine consisting of two clusters of rollers, 12's and 13's. Each cluster is coupled together by a continuous Nitinol bond, 11. Each cluster has one output shaft, 34. A number of these clusters form an engine by coupling the output shaft 34's together through the use of chains or the equivalent, not shown in the diagram.

Warm and cold water are introduced into the system in a direction normal to the paper of FIG. 4. For convenience, the area outside of the clusters is designated as the cross-sectional area of the flow path of the warm water, with 30 representing that of the inlet of the warm water with temperature of $S_1$ and 31 representing the outlet of the warm water, with temperature of $S_2$, as defined before.

Likewise, the areas inside the clusters are designated as the cross-sectional areas of the flow paths of the cold water, with 32 representing the inlet (with temperature $S_4$) and 33 the outlet (with temperature $S_3$).

Adjacent clusters are shown to revolve in opposite directions as represented by arrows 34 and 35. The arrangement of the rollers is made in symmetry in each cluster. These arrangements are specified for illustration only.

The Nitinol bands, 11, were treated to have a "memory" of the curvature of the smaller roller, 12, with a radius, 14, which defines the strain of the various parts of the material in relation with the surface strain $X_1$ (or somewhere between $X_0$ and $X_1$ when the "memory" is treated to have a curvature smaller than radius 14).

The engagement with the larger roller, 13, would introduce to the band a change in strain corresponding to $X_2$ of FIG. 3 by bending the band to a reverse curvature with a radius of 15.

Figure 5:
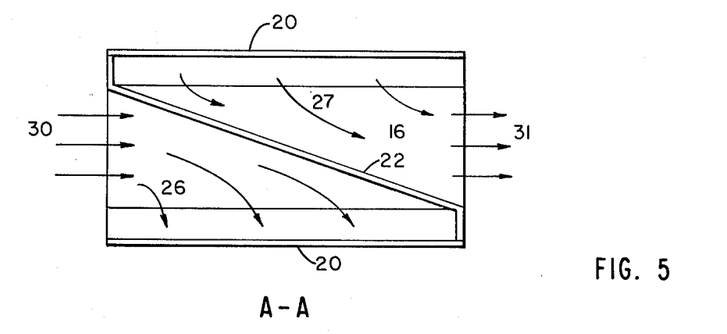
FIG. 5; Partition arrangement of one set of flow patterns.

Heat transfer between the warm water and the Nitinol band is effected by guiding the water to flow between the gap defined by vane, 16, and the section of the band covering over the roller, 13. Partition 20's and shield 19's divide the warm water into sections. Each serves adjacent pair of rollers and the associating sections of the band. An inclined partition, 22, divides the section into an inlet path, 26, and an outlet path, 27. The side view A—A, of the inclined partition 22, is shown more clearly in FIG. 5. In this particular illustration the water is directed to flow in a counter-flow pattern with respect to the motion of the band, to gain better heat transfer effect.

The cold water flow paths are channelled by the partition 21's and the shield 17's. These paths are identified as 32-33 and are located inside each cluster of rollers.

Figure 6:
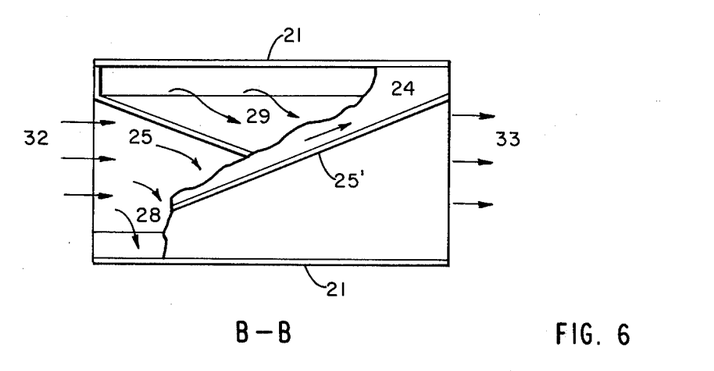
FIG. 6; Partition arrangement of a second set of flow patterns.

For the cold water, the heat transfer is effected by guiding the water to flow between the gap defined by vane, 18, and the section of the band covering roller 12. The water inlet 28's and outlet 29's to each gap are distributed uniformly along the width of the band by the use of the double pitched partition 25 and 25'. The inclination is represented by the dotted line arrows and is better represented by the side view B—B, as shown in FIG. 6.

The differential in the sizes of the two groups of rollers, 12 and 13, is shown to represent the need for morel transfer area for the warm water than for the cold water, as illustrated in equation 3 and FIG. 2.

The off-center arrangement of the roller is introduced to use the lateral component of the contact force between the rollers, to balance against the tension in the ribbon in order to minimize the bending effect and the bearing pressure of the roller.

The heat transfer is carried out between the band and the water directly. Shields 17's and 19's are used to block the heat flow in the wrong direction. A low thermal conductivity between the roller and the band is therefore also preferable.

Figure 7:
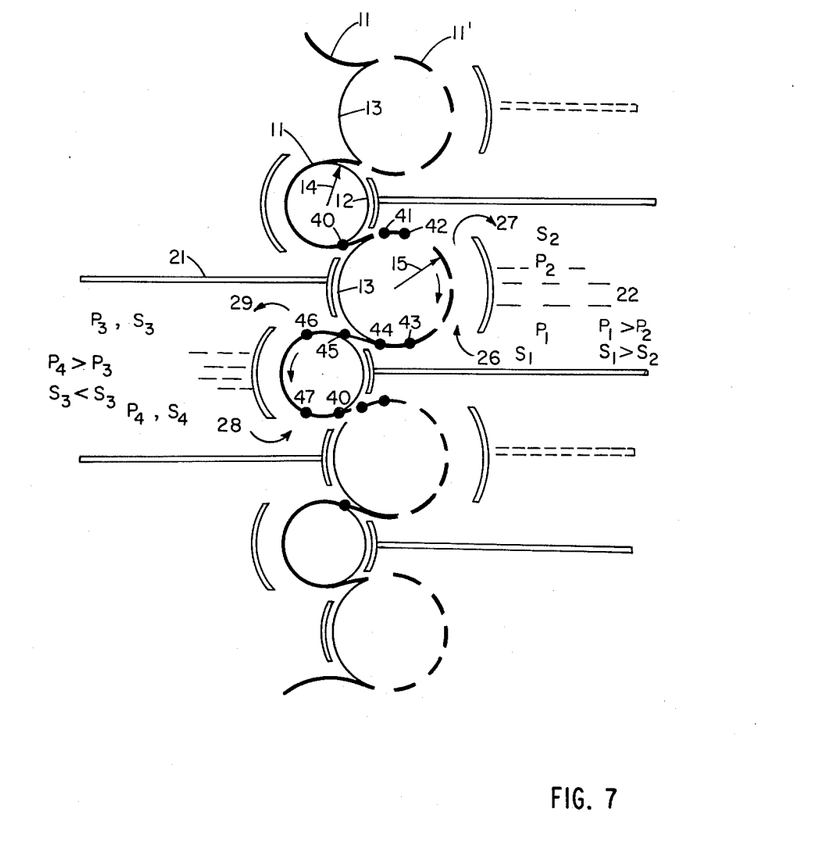
FIG. 7; An identification of the thermodynamic cycles on the running band of the Nitinol engine.

FIG. 7 shows an enlarged view of a section of the cluster of rollers of FIG. 4. Ribbon 11 is represented by a heavy line when it runs over the smaller rollers. The corresponding curvature also represents the pre-set shape, whereas the heavy dotted line is used to represent the section when it runs over the larger wheel, with the result of generating the maximum strain, as represented by $X_2$ of FIG. 2.

The four cycle operation of the engine, as specified before, can be identified by following the motion of the band from stations 40 and 47 and returning to 40 again.

°Cycle 1: Between 40-41 the band is already cooled to $T_2$ and is forced to change the curvature from a radius of 14 to a reversed bend of radius of 15. The strain corresponding to the curvature of roller 12 is considered as $X_0$ (or $X_1$) whereas the strain introduced by the curvature of the roller 13 would correspond to $X_2$ at the outer surfaces of the band. If there is thermodynamical temperature change at this cycle to alter the temperature $T_2$, this temperature change should be accounted for before the material enters station 40, to assure the sustaining of the temperature at $T_2$.

°Cycle 2: Between 'stations' 42 and 43 the temperature of the band is raised to $T_1$ by the warm water, which flows in a counter direction to that of the band. The warm water enters the gap with temperature $S_1$ and drops to $S_2$ at its exit. In this manner it is possible to have $T_1$ higher than $S_2$.

°Cycle 3: Between stations 44 and 45 the band returns to its original shape and thereby performs mechanical output.

°Cycle 4: Between stations 46 and 47 the band is cooled off to $T_2$ by the cold water stream which enters the cooling gap with a temperature $S_4$ and discharges with a temperature $S_3$. Again, due to counter flow arrangement, $T_2$ may be cooler than $S_3$.

Figure 8:
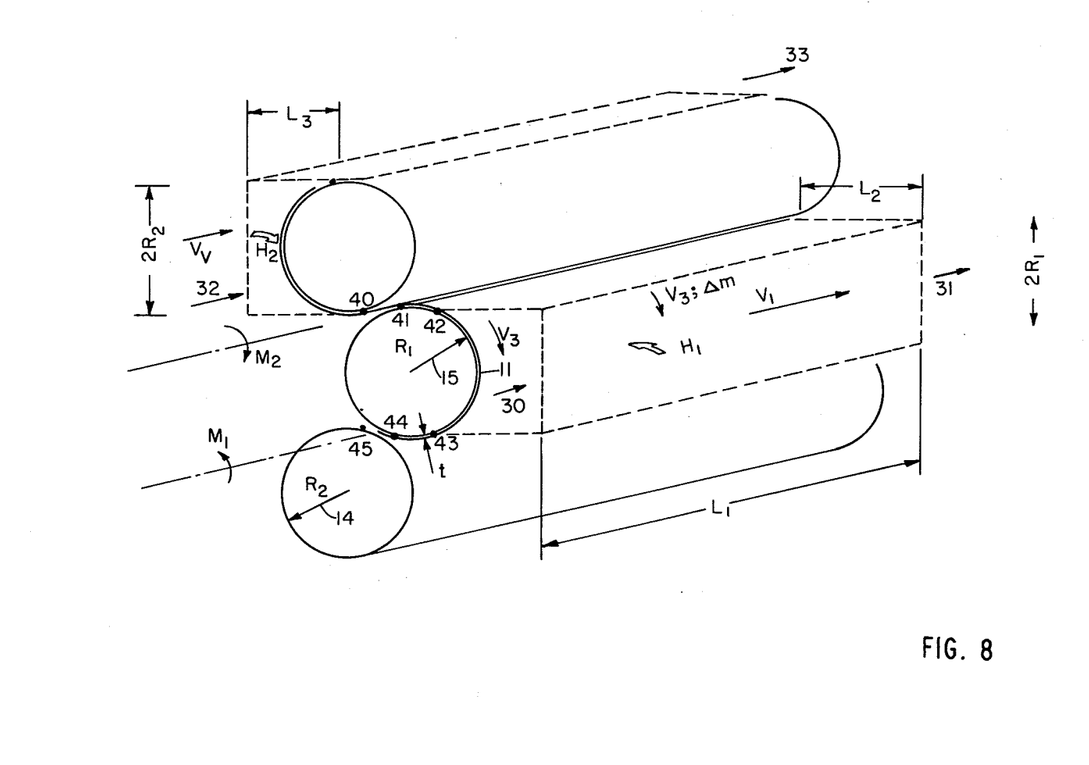
FIG. 8; An identification of the flow path of the various ingredients and energy of the Nitinol engine.

FIG. 8 illustrates the flow pattern of the energy converting media as well as the equilibrium condition of the various components involved in the engine.

The output power for each pair of the rollers 12 and 13 is proportional to the differential torque ($M_2 - M_1$) and the speed of the belt $V_3$ such as $$\text{Power} = \frac{(M_2 - M_1)}{R_1} \times V_3 \quad [4]$$

Where $M_2$, $M_1$ = torque applied to the rollers by the band
$V_3$ = belt speed.

DOMINATING PARAMETERS OF THE ENGINE

The torque produced by the band is equal to the difference of the two torques required to bend the band between the curvature of $R_1$ and $R_2$. This net torque is a function of the thickness, the maximum and minimum stress level of the band according to the following equation $$\Delta M = M_1 - M_2 = I \frac{(S_1 - S_2)}{t/2} \quad [5]$$

where $\Delta M$ = Net torque
I = moment of momentum of the cross section of the band
$S_1$, $S_2$ = change of stress due to change of curvature and change of temperature
t = thickness.

The radius of the two rollers is determined from the thickness, the stress, and the Young's modulus of the belt such as $$\frac{S_1}{E} = t/2 \left( \frac{1}{R_1} + \frac{1}{R_2} \right) \quad [6]$$

where E = Young's Modulus of Elasticity of the material
$1/R_1 + 1/R_2$ = change of curvature
$s_1$ = maximum allowable stress.

The velocity of the belt is represented by the heat needed by the belt and the heat transfer rate across the interface of the belt and the water $$H_1 \, 2R_1 L_1 = V_3 L_1 \, th \quad V_3 = \frac{\Delta TC \, 2R_1}{th} \quad [7]$$

where $H_1$ = thermal conductivity per unit area = $\Delta T$ C
and
$\Delta T$ = temperature gradient = $(S_1 + S_2)/2 - T_1$
C = coefficient of thermal conductivity
h = specific heat per unit volume needed for Nitinol during transition zone.

The input energy from the warm water and the discard energy to the cold water are transported by the flow paths adjacent to the band, as shown in FIG. 8, by the channels represented by dotted lines with inlet and outlet marked by 30, 31, 32 and 33. The partitioning plates 22 and 23, 16 and 18, distribute the main flow stream of FIG. 4, 5 and 6, which runs in parallel with the axis of the rollers, as shown by arrows $V_1$ and $V_2$ of FIG. 8, into side streams to make the counter-flow pattern in parallel with the movement of the band as shown by arrow $V_3$ of FIG. 8. In this manner the band is subjected to heating or cooling uniformly across its full width. The net heat input is equal to the flow rate through the channels multiplied by the temperature gradient $S_1 - S_2$ and $S_3 - S_4$ between the inlets and outlets of the channel, as discussed earlier in equation 3. Thus, $$H_1 = (S_1 - S_2) V_1 L_2 \, 2R_1 K \quad [8]$$

$$H_2 = (S_3 - S_4) V_2 L_3 \, 2R_2 K$$

Finally, where K = specific heat of source and sink (sea water)

$$N(H_1 - H_2) = \text{Power} \quad [9]$$

where N = conversion efficiency.

Equations [5] through [9] represent the basic equilibrium conditions of the proposed system. From these equations the performance of a typical engine and some of the salient features can be identified.

TYPICAL DESIGN OF A LARGE ENGINE

Starting from equation 5, it is assumed that a 0.020 thick Nitinol band is used, with a usable maximum stress $S_1$ = 150,000 psi and a relaxed stress $S_2$ = 30,000 psi. The width of the band ($L_1$ of FIG. 7) is 120". According to [5]

$$\Delta M = I \frac{150,000 - 30,000}{t/2} \quad [10]$$

$$= \frac{.020^3 \times 120}{12} \cdot \frac{120,000}{.020/2}$$

$$= 240 \text{ in lbs.}$$

$$= 20 \text{ ft lbs}$$

The radius of the roller may be estimated from equation 6, using E = $3 \times 10^7$ $$\frac{150 \times 10^3}{3 \times 10^7} = \frac{.020}{2} \left( \frac{1}{R_1} + \frac{1}{R_2} \right)$$

-continued $$h = \left(\frac{1}{R_1} + \frac{1}{R_2}\right) \text{ chose } R_1 = 5 \; R_2 = 3.3$$

The reason for using a larger roller for the heating than for the cooling is because more heat is to be admitted than discharged, in order to generate mechanical output.

The speed of the belt is to be determined from equation 7

$$V_3 = \frac{\Delta TC \, 2R_1}{th} \qquad [7]$$

and the output power from equation [4]

$$\text{Power} = \frac{\Delta M}{R_1} \times V_3 = 2\Delta M \frac{\Delta TC}{th} = 6L\frac{(\Delta s)(\Delta T) C_o}{h} \qquad [11]$$

which shows that the power is independent of the radius of the roller, but is directly proportional to the heat transfer coefficient $C_0$ (assuming $C_0 = C/t$) and inversely proportional to h.

Without knowing all the coefficient one may assume the rotational speed of the large roller to be 300 R.P.M. From this and the torque given in [10] we have $$\text{Power} = \frac{240}{12} \times 300 \times 2\pi \times \frac{1}{33000} = 1.1 \text{ horsepower}$$

Assume the equivalent of 10 horsepower of water at 5° F. temperature drop is to be pumped. We have $$\frac{2544}{5} \times 10 \simeq 5000 \text{ lbs of water per hour} \simeq 40 \text{ gal/min.}$$

which appears to be a rather low flow rate for a conduit with 15 inch wide spacing. This means the speed of the rotation may be higher than 300 R.P.M. and the output power may also be higher, such as 6 horsepower per shaft and 500 horsepower per cluster, occupying a $10' \times 10' \times 10'$ space.

The design of this system favors the use of light weight hollow rollers. The staggered arrangement of the rollers minimizes the bearing force and bending movement of the rollers.

The torque realized by the band depends upon the positive guidance of its curvature as illustrated by the instant reversal of the curvature between stations 40 and 41 and 44 and 45, as shown in FIG. 7 and equation [5].

SOME COMMON OVERSIGHTS IN THE PRIOR ART

Figure 9:
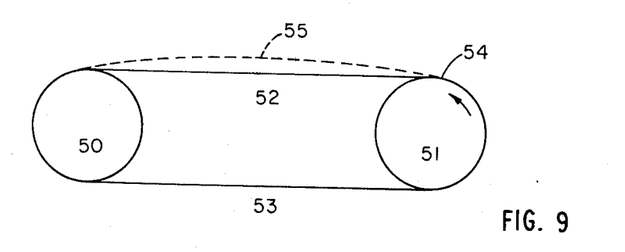
FIG. 9; Typical phenomenum of incompletely constrained band in prior art.

In some prior art, as shown in FIG. 9, the Nitinol band is stretched between rollers 50 and 51, with the straight line segments 52 and 53 between the rollers.

In this configuration it was conceived intuitively that the straight section 52 and 53 are guided to be straight. But in reality it is not guided by externally applied constraint but by the tension of the band. It is interesting to note that when a conventional belt is used to transmit power, the belt is assumed to be flexible with insignificant bending stiffness, while the torque of the pullies is transmitted by the tension of the belt. Now in Nitinol engine it is the change of the bending movement of the band that produces the torque and this torque can be realized in full only when the bending of the band is fully guided.

Figure 10:
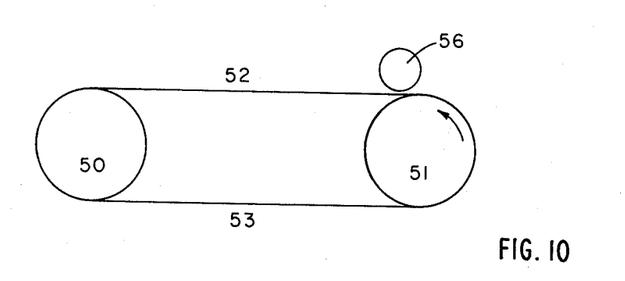
FIG. 10; Partial solution of the incompletely constrained band.
Figure 11:
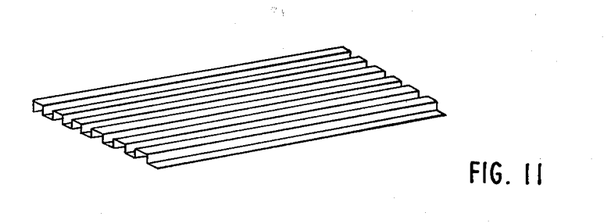
FIG. 11; A high efficiency Nitinol band with corrugations along the length of the band.
Figure 12:
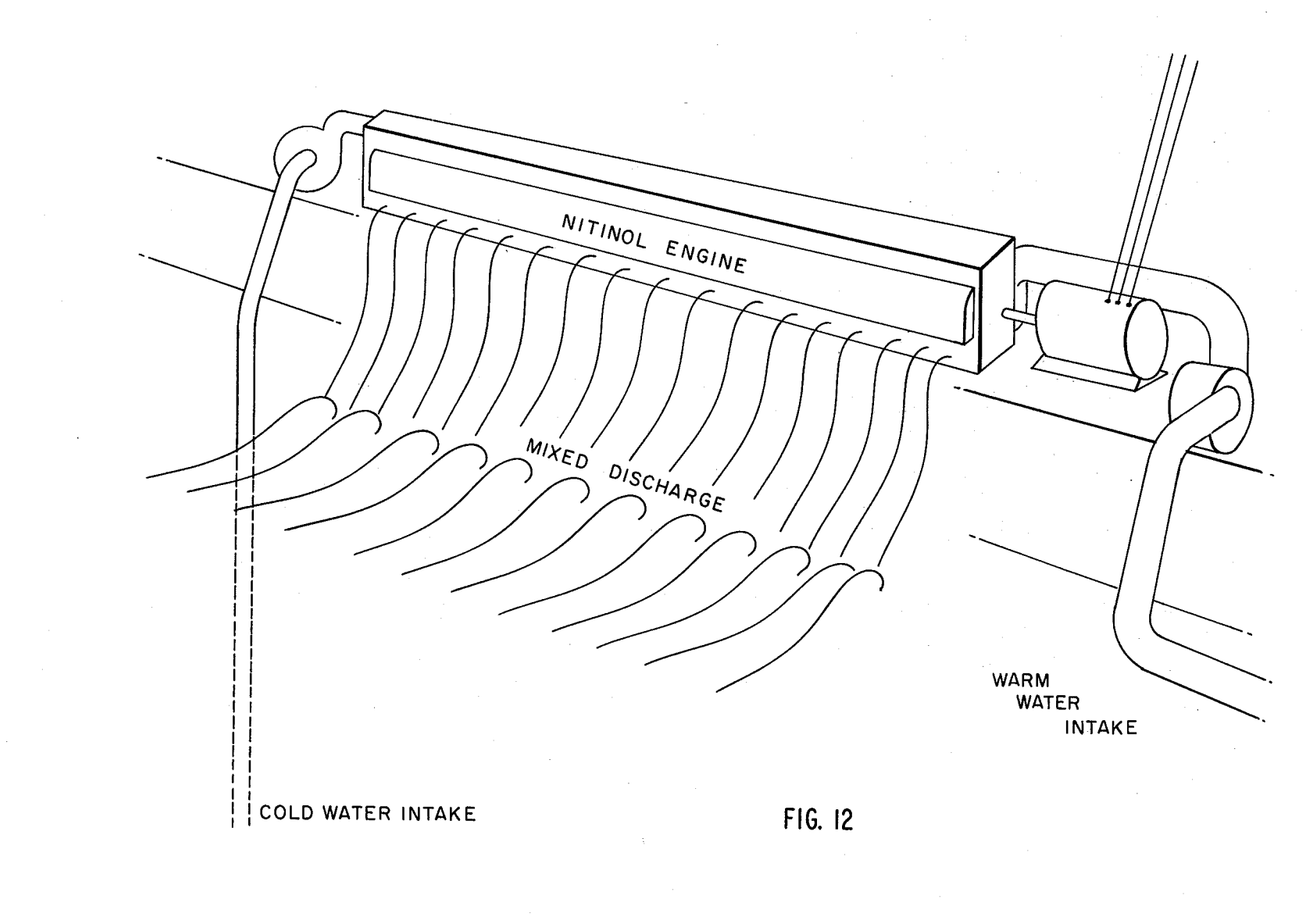
FIG. 12; Schematic rendering of the Nitinol Engine.

In the situation of FIG. 9, assuming the preferred curvature change is from that of the roller to that of a straight line, full torque may be realized if a back-up roller, 56, is placed near point 54, as shown in FIG. 10. This back-up roller, 56, unfortunately is not included in the prior arts. As a result the exit portion of the band of FIG. 9 will take a bend as shown in the dotted line, 55, of FIG. 9 and thus reduce the effective torque at point 54. In some other configurations in the prior art coil springs are used together with the roller configuration where the tension mode and the bending mode of the working medium add more confusion in the stress-strain relationship of the material throughout the working cycle.

OPTIMUM DESIGN OF THE NITINOL BAND

Equations 5 and 7 illustrate an important feature which is that the output power of the engine is proportional to the moment of momentum I, the coefficient of thermal conductivity C across the interface and inversely proportional to the cross-sectional area of the band. For this reason a corrugated band, as shown in FIG. 10, would be most desirable.

Having thus described my invention, I claim:

1. A thermal engine for converting a portion of the energy available between two heat sources with a temperature gradient between them comprising:
    a continuous band of material having a shape memory triggerable by an upper transition temperature and a lower transition temperature, said two transition temperatures being within the temperature gradient of the two heat sources,
    said band being capable of receiving heat from the warmer source and discharging heat to the cooler source,
    guiding means for guiding the band to permit continuous revolution,
    means for imparting to each of plural sections of the band a sequence of at least four cycles, including sequentially a shape transforming cycle, a thermal cycle, a shape transforming cycle, and a thermal cycle,
    said guiding means serving to provide first and second positive guides for the band to constrain it to glide along a heating curved path and a cooling curved path, respectively, during the two thermal cycles,
    said heating and cooling paths having different curvatures,
    means incorporating said heat sources to raise and lower the temperature of the band above and below the respective transition temperatures during said thermal cycles,
    means to constrain the band to glide and to change from one of the said curvatures to the other to accomplish the shape transforming cycle of the band, each said curvature changing guide constituting a shape transforming station, said shape transforming of the curvature of the band in going through the guided path of changing curvature providing an input or output of mechanical power, and
    means coupling the revolving band with output means to sum together the mechanical power occurring at each shape transforming station along the band to provide net output power.

2. A thermal engine with at least one continuous band of shape memory material according to claim 1, wherein each of the continuous bands is guided by guiding means comprising a cluster of two sets of smooth rollers, said band being woven through the two sets of rollers to assume a sequence of positive and negative curvatures guided by the rollers of the second set, said band being treated to have a memory in favor of one of the two said curvatures, said two sets of rollers being placed alternatively adjacent to each other to effect a curvature change of the band as it weaves through them, means incorporating the warmer heat source to transfer heat to the band over the first set of rollers, means incorporating the colder heat source to remove heat from the band over the second set of rollers, means to insulate the first set of rollers from the colder heat source, and means to insulate the second set of rollers from the warmer heat source.

3. A thermal engine according to claim 2 wherein said two sets of rollers define a sequence of S-shaped curves, said band being preconditioned to retain a radius of curvature equal to or larger than that of one set of rollers, said band assuming its maximum allowable stress over the other set of rollers, means incorporating the warmer heat source to transfer heat to the higher stressed portion of the band, and means incorporating the colder heat source to remove heat from the low stressed section of the band.

4. A thermal engine according to claim 2 wherein said band comprises a strip having a corrugated cross-sectional form to increase its heat transfer with its surrounding and having a higher stiffness-to-weight ratio than circular or flat strips.

5. A thermal engine according to claims 1, 2, 3, or 4 wherein said band is comprised of Nitinol.

6. A thermal engine according to claims 2, 3, or 4 wherein the rollers are offset alternatively to allow the lateral force due to the tension of the band acting upon the rollers to be balanced by the contact forces between the rollers.

7. A thermal engine according to claim 5 wherein the rollers are offset alternatively to allow the lateral force due to the tension of the band acting upon the rollers to be balanced by the contact forces between the rollers.

* * * * *